United States Patent [19]

Oku et al.

[11] 4,202,297
[45] May 13, 1980

[54] TWO-STROKE ENGINE HAVING VARIABLE EXHAUST PORT TIMING

[75] Inventors: Yuji Oku; Yasuharu Tsuyama, both of Iwata, Japan

[73] Assignee: Yamaha Hatsudoki Kabushiki Kaisha, Iwata, Japan

[21] Appl. No.: 916,751

[22] Filed: Jun. 19, 1978

[30] Foreign Application Priority Data

Jun. 22, 1977 [JP] Japan ............................ 52-82848[U]
Sep. 29, 1977 [JP] Japan ............................ 52-131349[U]

[51] Int. Cl.² ............................................. F02B 75/02
[52] U.S. Cl. ........................ 123/65 PE; 123/65 V; 123/65 A; 123/190 BE
[58] Field of Search ............ 123/65 PE, 65 PD, 65 V, 123/65 EM, 65 P, 65 A, 65 R, 190 BC, 190 BE, 190 BF, 190 A, 73 A, 73 R, 75 C, 80 BA; 60/314, 602, 603

[56] References Cited

U.S. PATENT DOCUMENTS

| | | | |
|---|---|---|---|
| 1,011,748 | 12/1911 | Coffin | 123/65 V |
| 4,121,552 | 10/1978 | Mithuo et al. | 123/65 PE |

FOREIGN PATENT DOCUMENTS

| | | | |
|---|---|---|---|
| 500899 | 3/1920 | France | 60/314 |
| 774366 | 12/1934 | France | 123/190 BE |
| 189194 | 11/1922 | United Kingdom | 123/190 BC |
| 272753 | 6/1927 | United Kingdom | 123/65 V |
| 292159 | 11/1928 | United Kingdom | 123/65 V |

*Primary Examiner*—Charles J. Myhre
*Assistant Examiner*—Magdalen Moy
*Attorney, Agent, or Firm*—Dennis P. Clarke

[57] ABSTRACT

Two-stroke engine having variable exhaust timing, which includes an exhaust timing control member disposed in the exhaust passage in the vicinity of the exhaust port. The member is of an elongated configuration having a diameter gradually decreasing from the opposite ends to the intermediate portion to provide an external contour of an arcuate sectional configuration. The member is divided into two parts at the intermediate portion in order to facilitate to assemble it in the engine.

3 Claims, 13 Drawing Figures

TWO-STROKE ENGINE HAVING VARIABLE EXHAUST PORT TIMING

The present invention relates to two stroke internal combustion engines and more particularly to exhaust means for two stroke engines.

Conventionally, two stroke engines include a cylinder having a cylindrical wall formed with exhaust and scavenging ports. A piston reciprocates in the cylinder and the ports are closed and opened by the piston at appropriate timings. The so-called port timings are therefore determined by heightwise positions of the ports.

It has been recognized that the exhaust port timing has an important influence on the engine performance. For example, under a high speed engine operation, it is recommendable to open the exhaust port at an earlier timing whereas the exhaust port timing should preferably be retarded under a low speed operation. Thus, proposals have already been made to provide exhaust means of variable timing so that the engine can be operated at an optimum exhaust timing throughout the operating speed range.

In the British Pat. No. 291,086, there is disclosed a two stroke engine having exhaust ports divided into upper and lower groups which are respectively communicating with an upper and lower exhaust passages. The upper exhaust passage is provided with a valve which is adapted to be controlled by a governor so that the exhaust port timing is changed in accordance with the running conditions of the engine. In this arrangement, the exhaust port timing can essentially be controlled only in two stages so that the arrangement cannot provide an infinitely variable exhaust port timing.

The U.S. Pat. No. 2,798,466 discloses an exhaust control device for two stroke engines in which a rotary valve is provided in the exhaust passage in the vicinity of the exhaust port. The rotary valve may be actuated in such a manner that the exhaust passage is shut off before the exhaust port is covered by the piston. This arrangement is disadvantageous, however, in that the rotary valve cannot be positioned sufficiently close to the exhaust port in the cylinder wall so that there remains a space between the exhaust port and the rotary valve. Further, the rotary valve provides an increased resistance to exhaust gas flow even under an open position. More important disadvantage in this type of arrangement is that the rotary valve is subjected to a substantial heat so that the valve may often be seized.

The U.S. Pat. No. 2,720,872 discloses two stroke engines in which the exhaust port is divided into an upper and lower ports and a rotary valve is provided for closing the upper port. The rotary valve is of a part-spherical configuration and the valve is disposed apart from the exhaust port opening at the cylinder wall. Therefore, a space is left between the exhaust port opening and the rotary valve. Further, no means is provided for eliminating problems which may be caused by heat applied to the valve from the exhaust gas.

The Japanese patent publication Sho 47-36047 teaches to provide an arcuate blade which is adapted to be moved between an operative and retracted positions. In the operative position, the blade covers the upper part of the exhaust port so that the exhaust port timing is retarded. In the retracted position, the blade is retracted in a recess provided for the purpose in the exhaust passage. The arrangement is disadvantageous in that the blade support arm extends across the exhaust passage in the retracted position of the blade causing an increase in the resistance to the exhaust gas flow.

The present invention has therefore an object to provide an exhaust port timing control device for two stroke engines, which is reliable in operation and does not have any inherent problem.

Another object of the present invention is to provide an exhaust port timing control device having means for cooling the control member so as to prevent any possible problem due to overheating of the control member.

A further object of the present invention is to provide an exhaust port timing control device which is simple to manufacture and assemble.

According to the present invention, the above and other objects can be accomplished by a two-stroke internal combustion engine comprising cylinder means having cylinder wall means formed with exhaust port means and scavenging port means, piston means disposed in said cylinder means for movement so that the exhaust and scavenging port means are cyclically closed by said piston means, exhaust passage means communicating with said exhaust port means, scavenging passage means communicating with said scavenging port means for passing fresh charge of intake gas into the cylinder means when the scavenging port means is opened by the piston means, exhaust port timing control means provided in said exhaust passage means adjacent to said exhaust port means, said exhaust port timing control means including rotary control member means having an axis extending transversely across the exhaust passage means at an upper portion thereof and having a general configuration in which diametrical dimension is gradually decreased from opposite ends towards an intermediate portion thereof to provide an external contour of an arcuate sectional configuration, said rotary control member means being partially cut-off to conform in configuration to the exhaust passage means and being movable between a retracted position wherein the cut-off is aligned with the exhaust passage means and a projected position wherein an edge of the cut-off is projected into the exhaust passage means.

According to a preferable aspect of the present invention, the scavenging passage means is passed near the rotary control member means so that the control member means is cooled by the intake gas passing through the scavenging passage means. In order to facilitate assembling of the control member means in the engine, the control member means may be divided into at least two parts at the intermediate portion where the diameter of the control member means is smallest. With this arrangement, the two divided parts of the control member means can be inserted into a corresponding bore in the engine body from the opposite ends. Preferably, the control member means is rotated in accordance with the engine speed so that the exhaust port timing is suitably determined throughout the operating range of the engine. Further, cooling water jacket means may be provided just above the control member means so that the valve means is adequately cooled.

The above and other objects and features of the present invention will become apparent from the following descriptions of a preferred embodiment taking reference to the accompanying drawings, in which.

Figure 1:
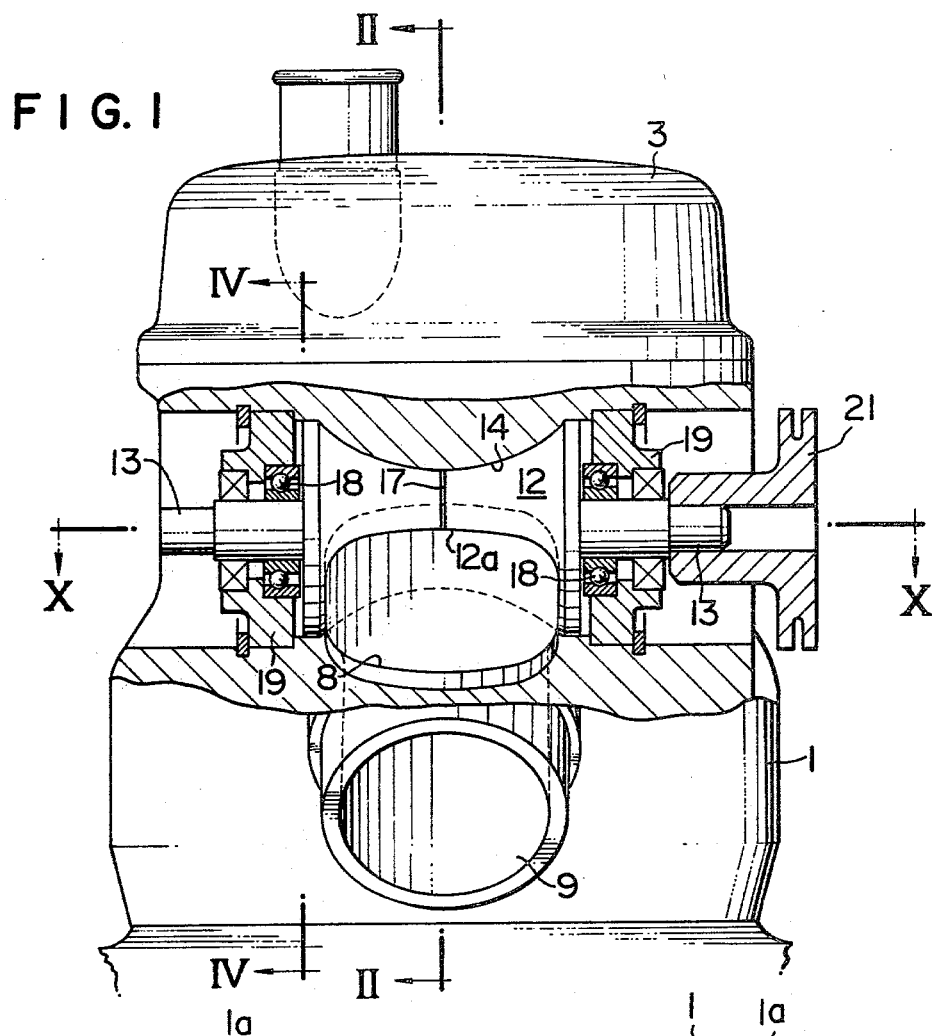
FIG. 1 is a sectional view of a two stroke engine having an exhaust port timing control device in accordance with one embodiment of the present invention.
Figure 2:
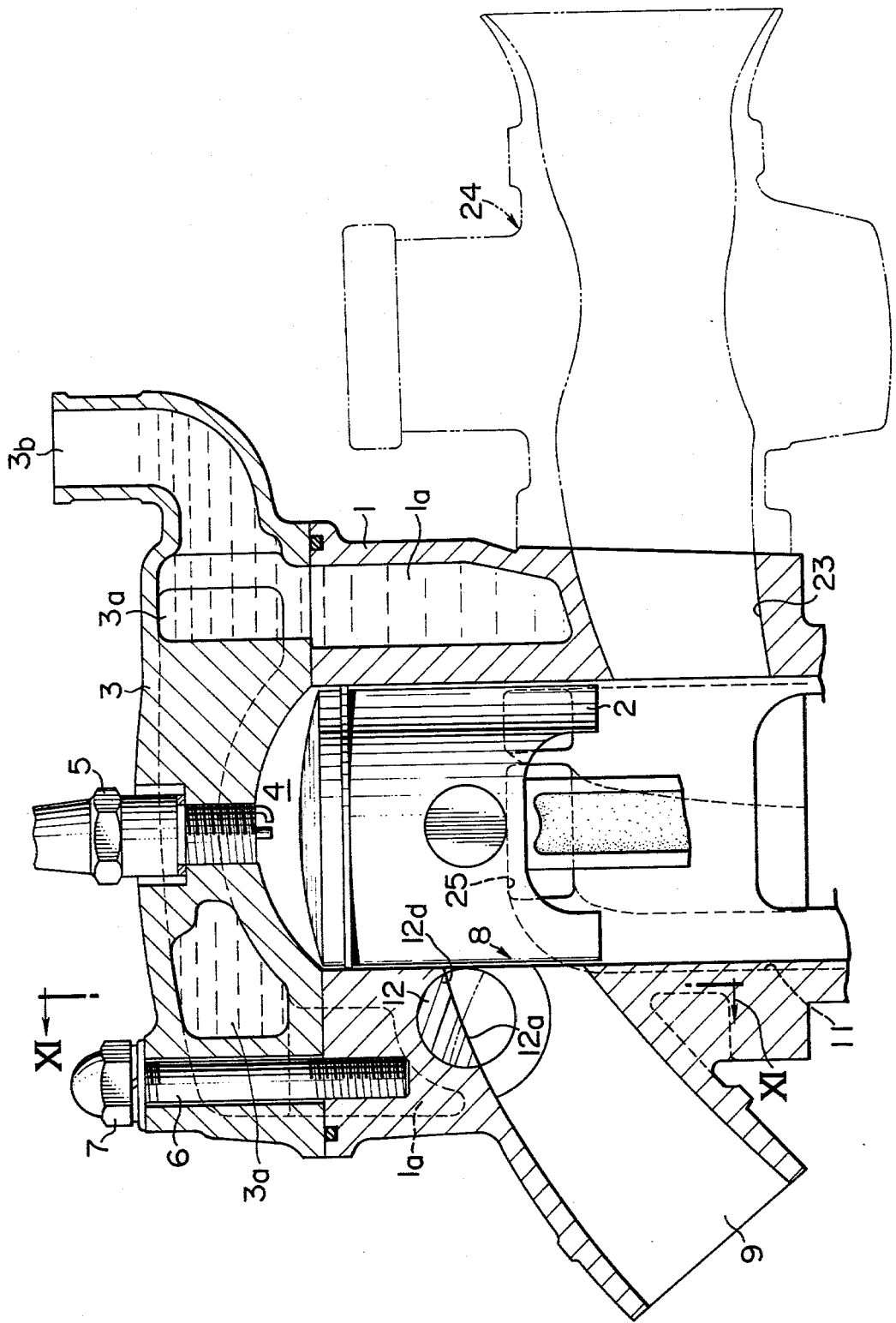
FIG. 2 is a sectional view of the two stroke engine taken substantially along the line II—II in FIG. 1.
Figure 3A:
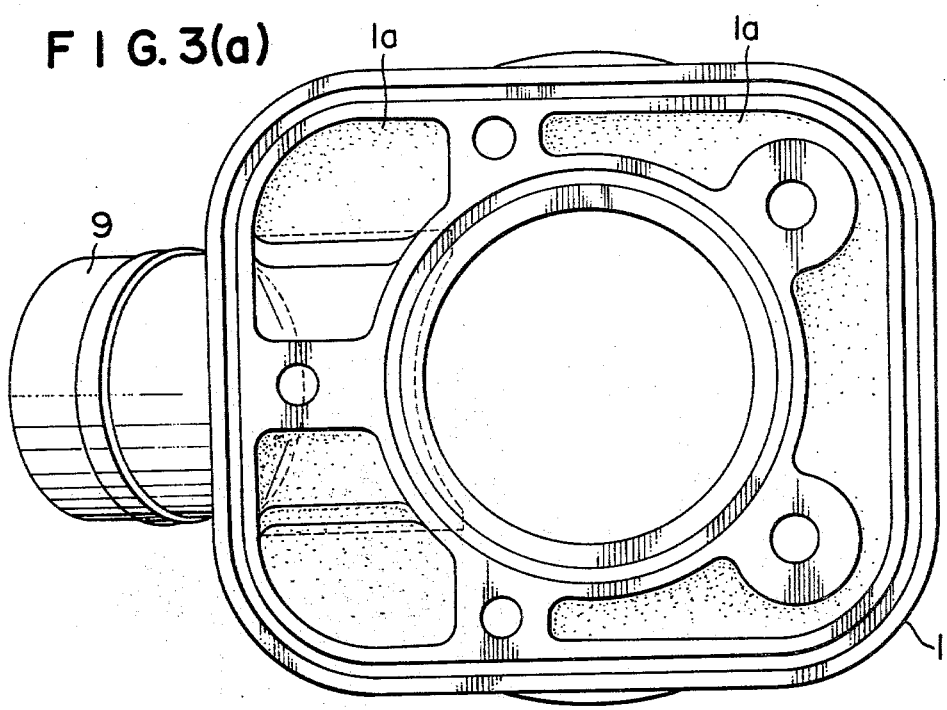
FIG. 3(a) is a top plan view of the cylinder of the engine shown in FIGS. 1 and 2.
Figure 3B:
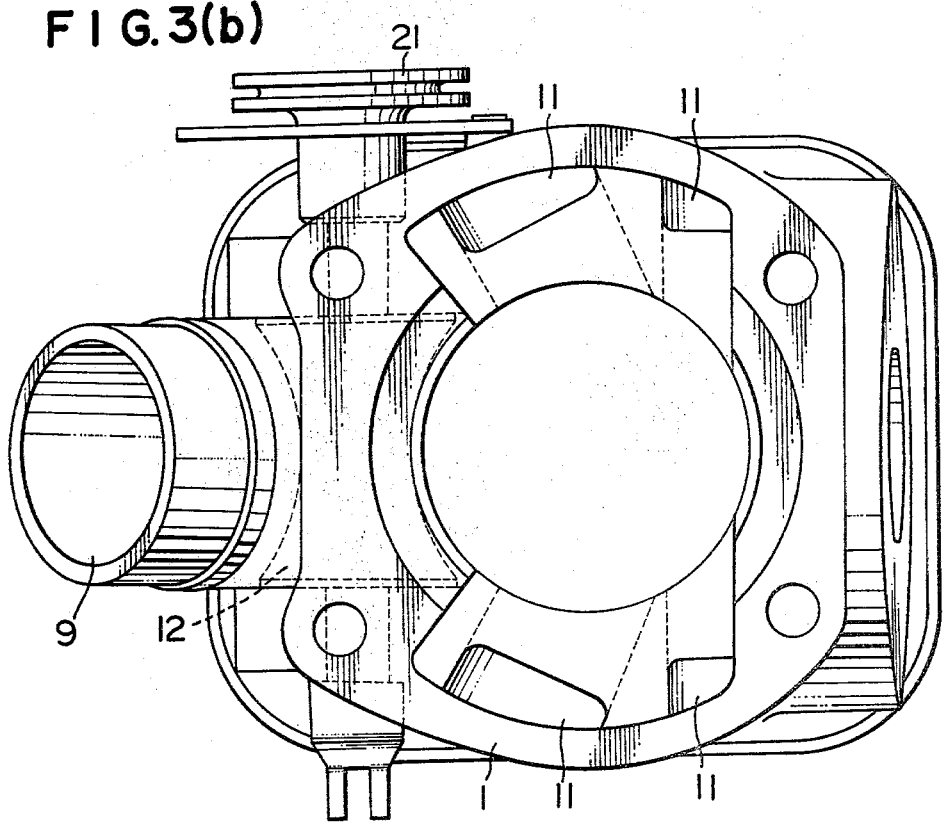
FIG. 3(b) is a bottom plan view of the cylinder shown in FIG. 3(a)

Referring now to the drawings, particularly to FIGS. 1 and 2, there is shown a two stroke engine comprising a cylinder 1 having a cylinder bore, a piston 2 which is disposed in the cylinder bore for reciprocating movement, and a cylinder head 3 secured to the top end of the cylinder 1 by means of tightening studs 6 and nuts 7. Thus, a combustion chamber 4 is defined by the cylinder 1, the piston 2 and the cylinder head 3. An ignition plug 5 is mounted on the cylinder head 3 as in conventional engines. The cylinder 1 and the cylinder head 3 are respectively provided with cooling water jackets $1a$ and $3a$ which are supplied with cooling water through an inlet $3b$.

Figure 5:
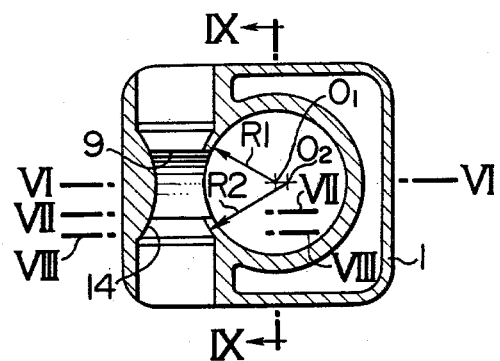
FIG. 5 is a horizontal sectional view showing the cavity for receiving the rotary exhaust port timing control member.
Figure 6:
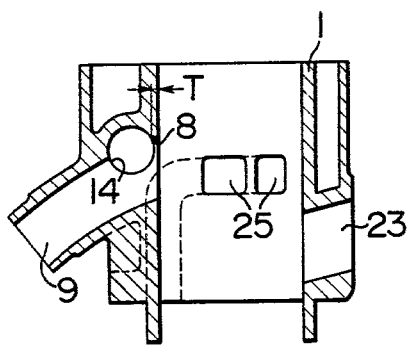
FIG. 6 is a sectional view taken along the line VI—VI in FIG. 5.
Figure 9:
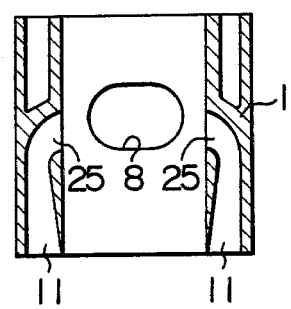
FIG. 9 is a sectional view taken along the line IX—IX in FIG. 5.
Figure 7:
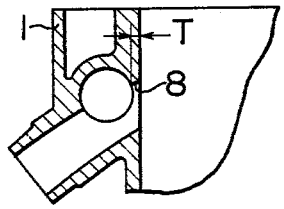
FIG. 7 is a sectional view taken along the line VII—VII in FIG. 5.
Figure 8:
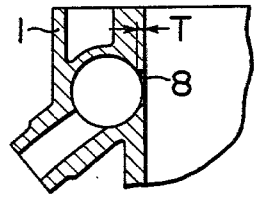
FIG. 8 is a sectional view taken along the line VIII—VIII in FIG. 5.

The cylinder 1 is formed with an exhaust port 8 communicating with an exhaust passage 9 as well as a plurality of scavenging ports 25 communicating with scavenging passages 11. As well known in the art, the ports 8 and $11a$ are cyclically closed by the piston 2 reciprocating in the cylinder bore. The port opening timings are therefore determined by the heightwise locations of the ports. In order to make it possible to control the exhaust port timing as desired, a port timing control device is provided. More specifically, the cylinder 1 is formed at the upper portion of the exhaust passage 9 in the vicinity of the exhaust port 8 with a recess 14 having an axis extending transversely of the exhaust passage 9. In the recess 14, there is disposed a rotatable exhaust port timing control member 12 which has a diameter gradually decreasing from the opposite ends toward the axially intermediate portion to provide an outer contour having an annular cross-section. The recess 14 in the cylinder 1 has a corresponding configuration and as shown in FIG. 5 the axial horizontal section has an annular curvature with a radius of curvature $R_2$ greater than the radius $R_1$ of the cylinder bore. Further, the curvature of the recess 14 has a center $O_2$ which is located at a side of the center $O_1$ of the cylinder bore opposite to the recess 14. It should therefore be noted that a thin wall is formed between the recess 14 and the cylinder bore and that the thickness of the wall is substantially uniform but gradually decreasing from the portions corresponding to the opposite ends of the recess 14 to the portion corresponding to the intermediate or center portion of the recess 14.

The control member 12 has axially aligned support shafts 13 at the opposite ends and is rotatably supported on the cylinder 1 at the support shafts 13 through bearings 18 and support rings 19 as shown in FIG. 1. The support rings 19 are maintained in position by clip rings. The rotatable member 12 is so located with respect to the exhaust passage 9 that a portion of the member 12 can be projected into the exhaust passage 9. Further, the control member 12 is formed with a cut-off portion $12a$ which is as shown in FIGS. 1 and 2 of a configuration conforming to the contour of the exhaust passage 9.

Figure 10:
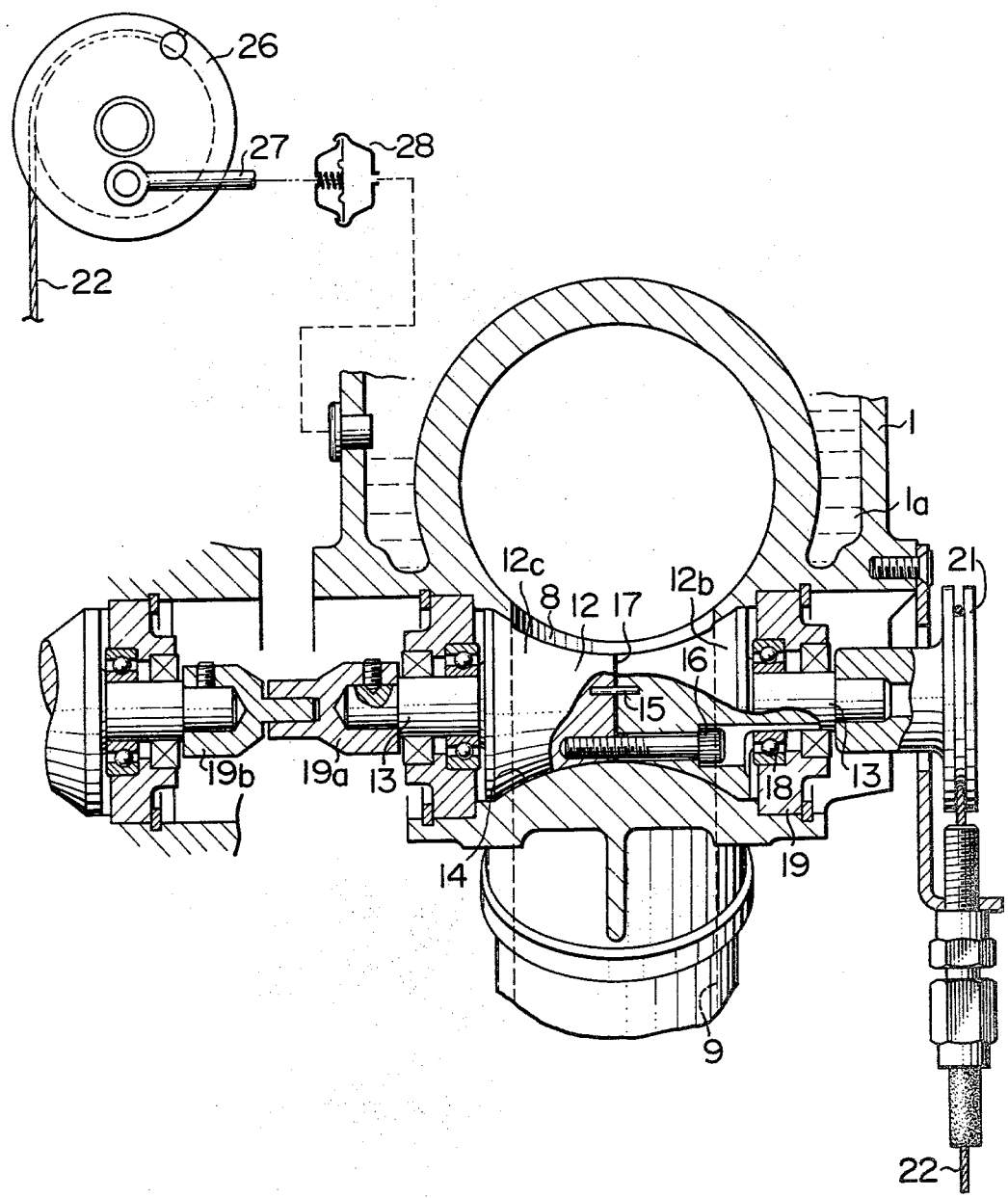
FIG. 10 is a sectional view taken along the line X—X in FIG. 1.
Figure 12:
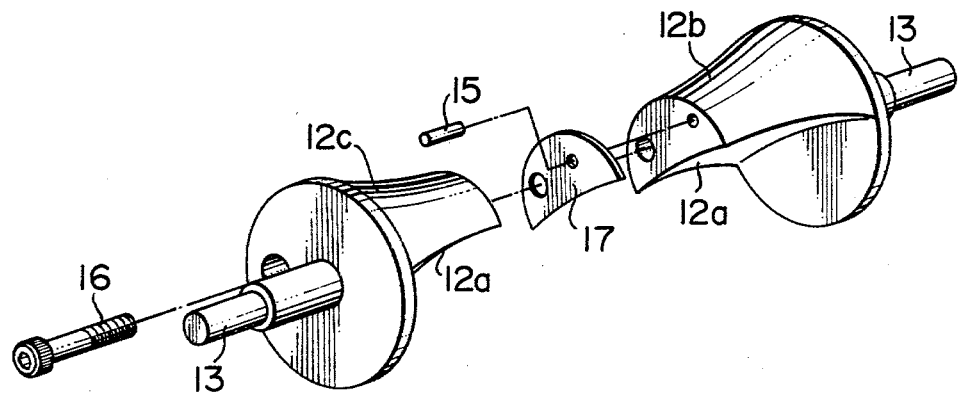
FIG. 12 is an exploded perspective view of the rotary exhaust port timing control member.

As shown in FIGS. 10 and 12, the rotatable control member 12 is comprised of two parts $12b$ and $12c$ which are separated at the portion of minimum diameter and connected together by an axial bolt 16. In order to ensure an accurate positioning of the parts $12b$ and $12c$, a locating pin 15 is provided between the two parts $12b$ and $12c$. A shim 17 of a suitable thickness may be interposed between the parts $12b$ and $12c$ so that the gap between the control member 12 and the recess 14 can be appropriately controlled.

One of the support shafts 13 carries a pulley 21 which is connected with one end of a control cable 22, the other end of the cable 22 being connected with a pulley 26 which is connected through a push rod 27 with an actuator 28. The actuator 28 serves to rotate the pulley 26 in accordance with the pressure of cooling liquid that may be proportional to the engine speed. Thus, the control member 12 is rotated between a retracted position wherein the cut-off portion $12a$ is aligned with the exhaust passage 9 so as to provide a smooth passage wall as shown by solid lines in FIG. 2 and a projected position wherein the upstream side edge $12d$ of the cut-off portion is projected into the exhaust passage 9 as shown by dotted lines. In the projected position of the control member 12, the exhaust port timing is retarded. The other support shaft 13 has a connector $19a$ which is adapted to be connected with a corresponding connector $19b$ on one support shaft 13 in an adjacent cylinder (FIG. 10).

Figure 4:
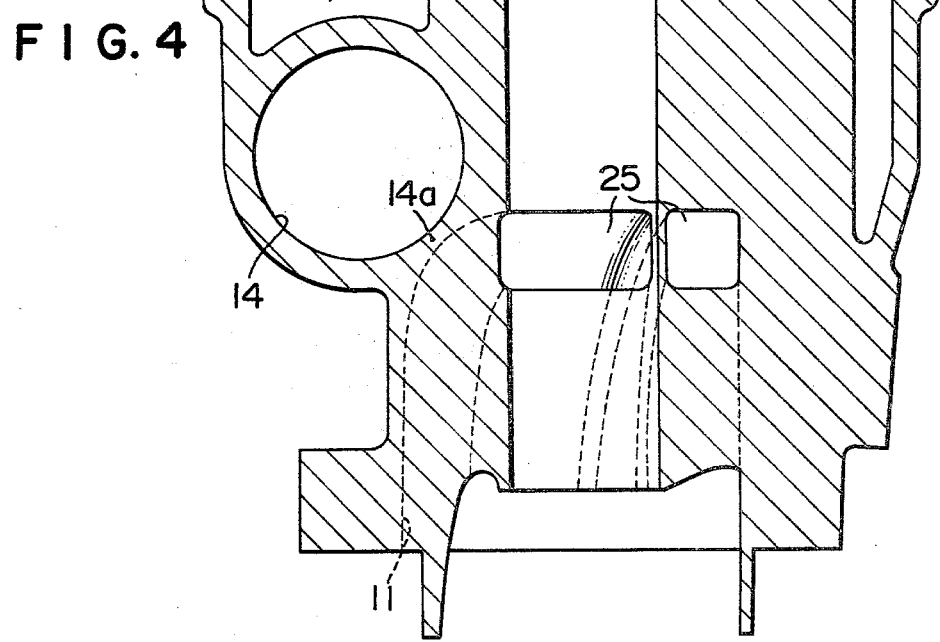
FIG. 4 is a sectional view of the cylinder substantially taken along the line IV—IV in FIG. 1.
Figure 11:
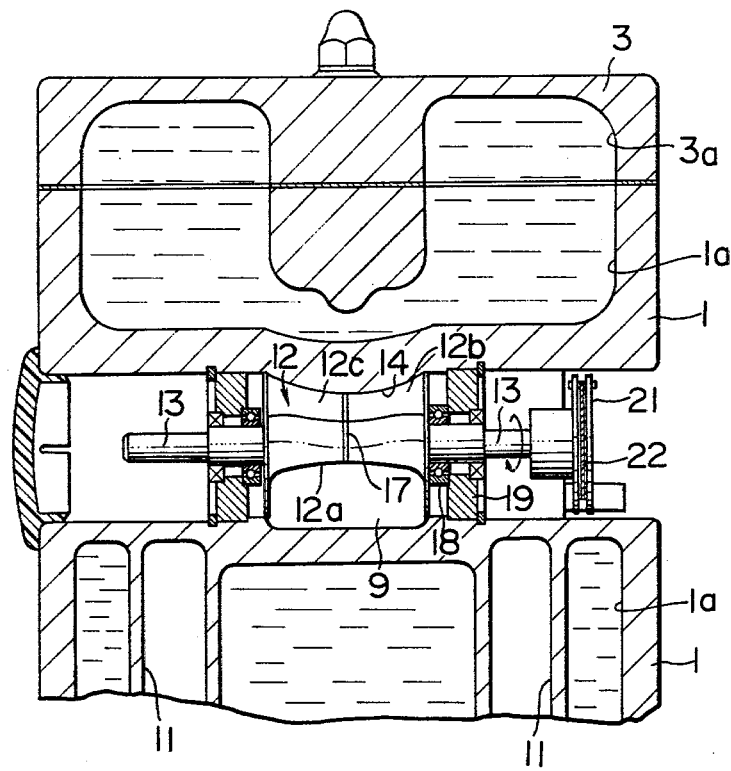
FIG. 11 is a sectional view taken along the line XI—XI in FIG. 2.

As shown in FIGS. 2 and 4, the scavenging passages 11 communicating with the scavenging ports 25 are curved in such a manner that they pass just below the opposite ends of the recess 14 to leave thin walls $14a$ therebetween. Further, as shown in FIGS. 2 and 11, the cooling water jacket $1a$ extends to a portion above the recess 14.

In the engine constructed as described above, the rotatable control member 12 is controlled by the aforementioned actuator so that it takes an appropriate position in accordance with the engine speed and/or the engine load. For example, the member 12 may be rotated to the fully projected position as shown by the dotted lines in FIG. 2 under a low speed operation so that the exhaust port opening timing is retarded. As the engine speed increases, the control member 12 is gradually rotated toward the retracted position and ultimately it may be moved to the fully retracted position as shown by the solid lines in FIG. 2 under a high speed operation. For the purpose, the actuator may be controlled by an engine speed sensing device. Alternatively, it may be controlled in accordance with the engine throttle valve opening.

It should be noted that the rotatable control member 12 is subjected to a high temperature which is applied thereto from combustion gas. However, since the scavenging passages 11 pass near the recess 14 for the rotatable control member 12, the member 12 is cooled by the intake air or mixture so that the temperature of the member 12 can be maintained at a relatively low level. Further, since the scavenging passages 11 are in the vicinity of the opposite end portions of the control member 12, it is possible to lead the intake gas with heat exchanging relationship at relatively wide areas. The cooling of the control member 12 is further enhanced by the cooling liquid which passes through the water jacket 1a lying above the control member 12.

The invention has thus been shown and described with reference to a specific embodiment, however, it should be noted that the invention is in no way limited to the details of the illustrated structures but changes and modifications may be made without departing from the scope of the appended claims.

We claim:

1. Two-stroke internal combustion engine comprising cylinder means having cylinder wall means formed with exhaust port means and scavenging port means, piston means disposed in said cylinder means for movement so that the exhaust and scavenging port means are cyclically closed by said piston means, exhaust passage means communicating with said exhaust port means, scavenging passage means communicating with said scavenging port means for passing fresh charge of intake gas into the cylinder means when the scavenging port means is opened by the piston means, exhaust port timing control means provided in said exhaust passage means adjacent to said exhaust port means, said exhaust port timing control means including rotary control member means having an axis extending transversely across the exhaust passage means at an upper portion thereof and having a general configuration in which diametrical dimension is gradually decreased from opposite ends towards an intermediate portion thereof to provide an external contour of an arcuate sectional configuration, said rotary control member means being comprised of two parts which are divided at said intermediate portion where the member means has the smallest diameter and being partially cut off to conform in configuration to the exhaust passage means and being movable between a retracted position wherein the cut off is aligned with the exhaust passage means and a projected position wherein an edge of the cut off is projected into the exhaust passage means.

2. Two-stroke engine in accordance with claim 1 in which said rotary control member means is mounted on the cylinder means through support ring means at the opposite ends thereof.

3. Two-stroke internal combustion engine comprising cylinder means having cylinder wall means formed with exhaust port means and scavenging port means, piston means disposed in said cylinder means for movement so that the exhaust and scavenging port means are cyclically closed by said piston means, exhaust passage means communicating with said exhaust port means, scavenging passage means communicating with said scavenging port means for passing fresh charge of intake gas into the cylinder means when the scavenging port means is opened by the piston means, exhaust port timing control means provided in said exhaust passage means adjacent to said exhaust port means, said exhaust port timing control means including rotary control member means having an axis extending transversely across the exhaust passage means at an upper portion thereof and having a general configuration in which diametrical dimension is gradually decreased from opposite ends towards an intermediate portion thereof to provide an external contour of an arcuate sectional configuration having a radius which is greater than the radius of the cylindrical wall means with the center of the arc located at a side of the center of the cylinder opposite to the side where the control member means is located, said rotary control member means being partially cut off to conform in configuration to the exhaust passage means and being movable between a retracted position wherein the cut off is aligned with the exhaust passage means and a projected position wherein an edge of the cut off is projected into the exhaust passage means.

* * * * *